Figure 1:
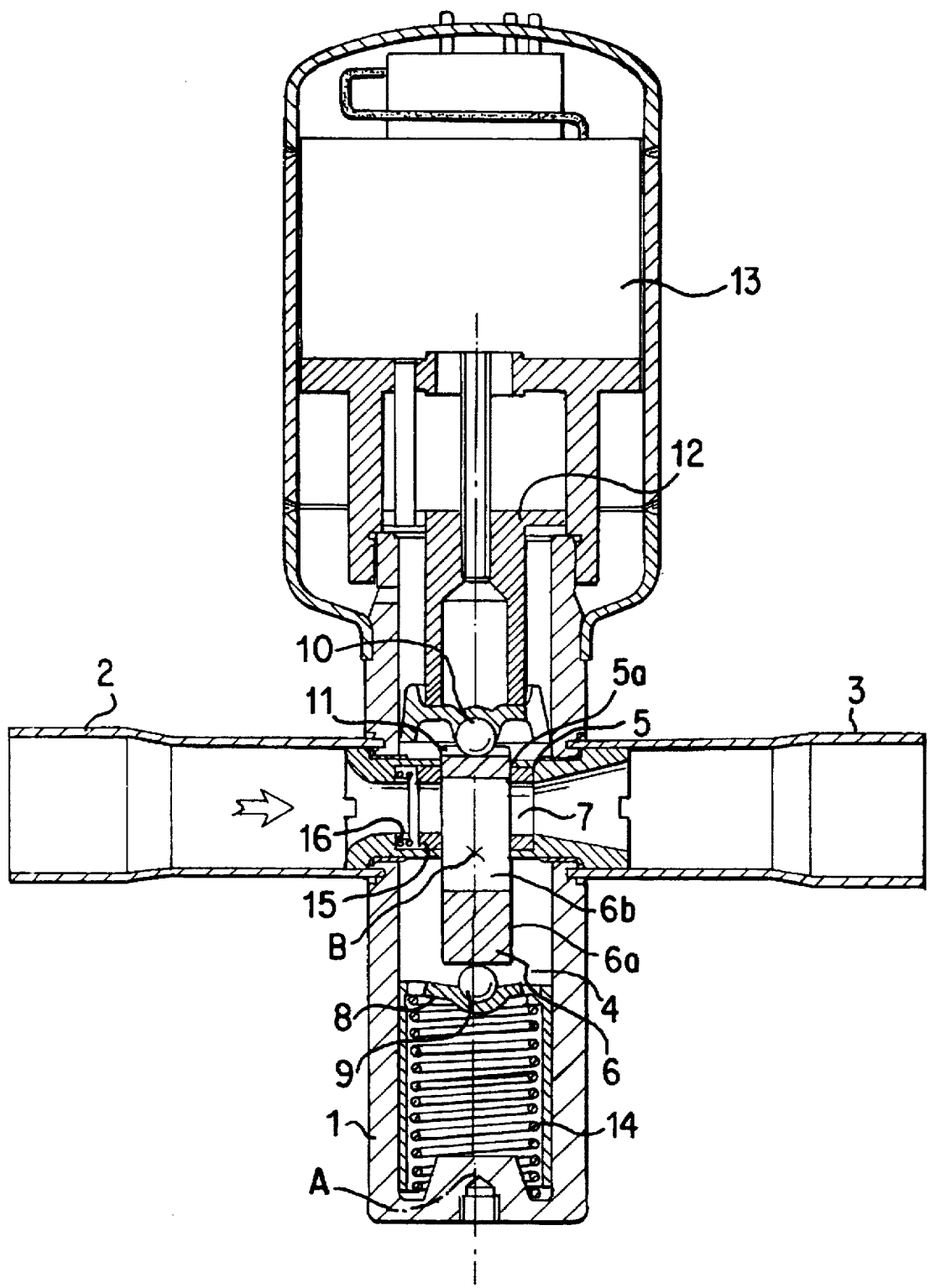

United States Patent [19]

Maurer et al.

[11] Patent Number: 5,735,501
[45] Date of Patent: Apr. 7, 1998

[54] VALVE ARRANGEMENT

[75] Inventors: Rainer Maurer, Stuttgart; Ludwig Reisinger, Waiblingen, both of Germany

[73] Assignee: Emerson Electric GmbH & Co., Germany

[21] Appl. No.: 648,818

[22] Filed: May 16, 1996

[30] Foreign Application Priority Data

May 19, 1995 [DE] Germany ............ 195 18 429.7

[51] Int. Cl.$^6$ .............................. F16K 3/02; F16K 25/00
[52] U.S. Cl. .................. 251/85; 251/86; 251/327; 251/328
[58] Field of Search ............... 251/84, 85, 86, 251/326, 327, 328, 329, 129.01

[56] References Cited

U.S. PATENT DOCUMENTS

| | | | |
|---|---|---|---|
| 322,084 | 7/1885 | Wilder | 251/86 |
| 1,675,986 | 7/1928 | Mason | 251/327 |
| 2,404,349 | 7/1946 | Brant et al. | 251/86 |
| 3,482,816 | 12/1969 | Arnold | 251/329 |
| 3,533,598 | 10/1970 | Tillman, III | 251/327 |
| 3,614,061 | 10/1971 | Fitzpatrick | 251/328 |
| 3,696,831 | 10/1972 | Fowler et al. | 251/84 |
| 3,871,615 | 3/1975 | Donner | 251/327 |
| 3,871,616 | 3/1975 | Taylor | 251/84 |
| 3,893,652 | 7/1975 | Natho | 251/84 |
| 3,933,339 | 1/1976 | Dietzsch | 251/86 |
| 4,205,704 | 6/1980 | Benson | 251/86 |
| 4,230,299 | 10/1980 | Pierce, Jr. | 251/326 |
| 4,372,531 | 2/1983 | Rollins et al. | 251/328 |
| 4,408,627 | 10/1983 | Harris | 251/86 |
| 4,524,951 | 6/1985 | Green et al. | 251/86 |
| 4,986,085 | 1/1991 | Tischer | 251/326 |

FOREIGN PATENT DOCUMENTS

| | | |
|---|---|---|
| 53-103231 | of 1978 | Japan. |
| 57-60505 | of 1982 | Japan. |
| 62-17471 | of 1987 | Japan. |

*Primary Examiner*—George L. Walton
*Attorney, Agent, or Firm*—Evenson, McKeown, Edwards & Lenahan, P.L.L.C.

[57] ABSTRACT

A valve arrangement is illustrated and described, in particular an electronic expansion valve arrangement, for pneumatic or hydraulic pressure media comprising a valve housing having a first medium connection and a second pressure medium connection, which are connected together by a throughflow space formed in a cavity of the housing, and a slider element which is arranged in the valve housing and cooperates with a valve seat, with the slider element being operationally connected to a positioning element of a drive and being displaceably guided parallel to the valve seat between a closed position, in which the one contact surface of the slider element closes a throughflow opening formed by the valve seat, and an open position, in which a throughflow passage formed in the slider element frees the throughflow opening. The valve arrangement can be installed in a simple manner in that the slider element is arranged in a frame which is connected to or held on the positioning element and is tiltable relative to the frame about at least two axes and displaceable transversely to the contact surface.

22 Claims, 4 Drawing Sheets

VALVE ARRANGEMENT

The present invention relates to a valve arrangement, in particular an electronic expansion valve arrangement, for pneumatic or hydraulic pressure media comprising a valve housing having a first and a second pressure medium connection, which are connected together by a throughflow space formed in a cavity of the housing, and a slider element which is arranged in the valve housing and cooperates with a valve seat, with the slider element being operationally connected to a positioning element of a drive and being displaceably guided parallel to the valve seat between a closed position, in which the one contact surface of the slider element closes a throughflow opening formed by the valve seat, and an open position, in which a throughflow passage formed in the slider element frees the throughflow opening, and wherein the slider element is displaceable in the direction towards the valve seat and back.

In a valve arrangement of this kind, which is known from U.S. Pat. No. 3,533,598, the slider element is held between the drive shaft of a motor and a spindle which engages into a blind bore provided in the base of the valve housing and is displaceably arranged in this bore in the longitudinal direction, with the slider element being displaceable relative to the drive shaft and the spindle in the direction towards the valve seat and back in order to compensate for an axial offset between the drive shaft and the spindle.

The known valve arrangement is complicated to manufacture because an axially parallel alignment is required between the drive shaft and the spindle for problemfree operation, so that the components must be very accurately manufactured.

Moreover, it is frequently found to be disadvantageous that the slider element of the known valve arrangement can only by exchanged with difficulty because the drive shaft must be built out of the valve housing for this purpose.

The object of the invention is to provide a valve arrangement of the initially named kind which is simple and priceworthy to manufacture and which ensures a simple installation and removal of the slider element.

This object is essentially satisfied in that the slider element is arranged in a frame mounted to or held at the positioning element and is tiltable relative to the frame about at least two axes.

In accordance with the invention the frame and the slider element form a unit which can be preassembled and which is securable to the positioning element of the drive. Through the possibilities of the adjustment of the slider element relative to the frame provided by the invention the slider element can be brought in a simple manner into its predetermined position and orientation at the valve seat through suitable choice of the tilting axes.

In advantageous manner a compression spring arrangement can be provided in the valve housing for the mounting of the frame at the positioning element, with the compression spring element pressing the frame against the positioning element and holding it at the positioning element. Through this arrangement a particularly simple exchange of the frame is possible, since the frame only needs to be positioned in the valve housing between the compression spring element and the positioning element, and is then held by the spring force of the compression spring element without further fixation.

In accordance with a preferred arrangement the frame consists at least regionally of a resilient material so that the slider element can be held in the frame by the spring force of the elastic material and the slider element is journalled and guided in the frame by rolling elements or sliding elements at its opposite sides in the direction of adjustment of the slider element. Through this arrangement it is ensured that the slider element can be secured and journalled in a simple manner and without complicated fixing means at the frame, and that the slider element can in particular also be rapidly exchanged without having to release the frame from the positioning means.

In accordance with a further embodiment of the valve arrangement of the invention the slider element is guided between the valve seat and a guide element arranged in the valve housing opposite to the valve seat, with the guide element being movable in the direction towards the valve seat and being biased in the direction of the valve seat by a spring element or another suitable means arranged in a fixed position at the valve housing and pressing the slider element against the valve seat. Through this design it is ensured that the slider element is held under pressure at the valve seat and thus a precise guidance of the slider element is ensured. In the simplest case the guide element can for example be a ball which has point contact with the slider element.

In accordance with a further embodiment provision is made for the pressure medium connections to be offset in the direction of adjustment of the slider element at the valve housing and for a ring space surrounding the throughflow space to be formed between the first pressure medium connection and the throughflow space in the valve housing, with the ring space being connected to the throughflow space by two diametrically oppositely disposed connection openings, and with the valve seat and the guide element being provided at the connection openings and with a further valve seat cooperating with the slider element being provided at the guide element. In this arrangement a pressure medium simultaneously flows through the oppositely disposed connection openings from the ring space into the throughflow space or vice versa, so that the frictional forces which arise during this flow process mutually cancel each other. In this way a particular uniform loading of the valve seats provided at the connection openings is achieved.

Figure 2:
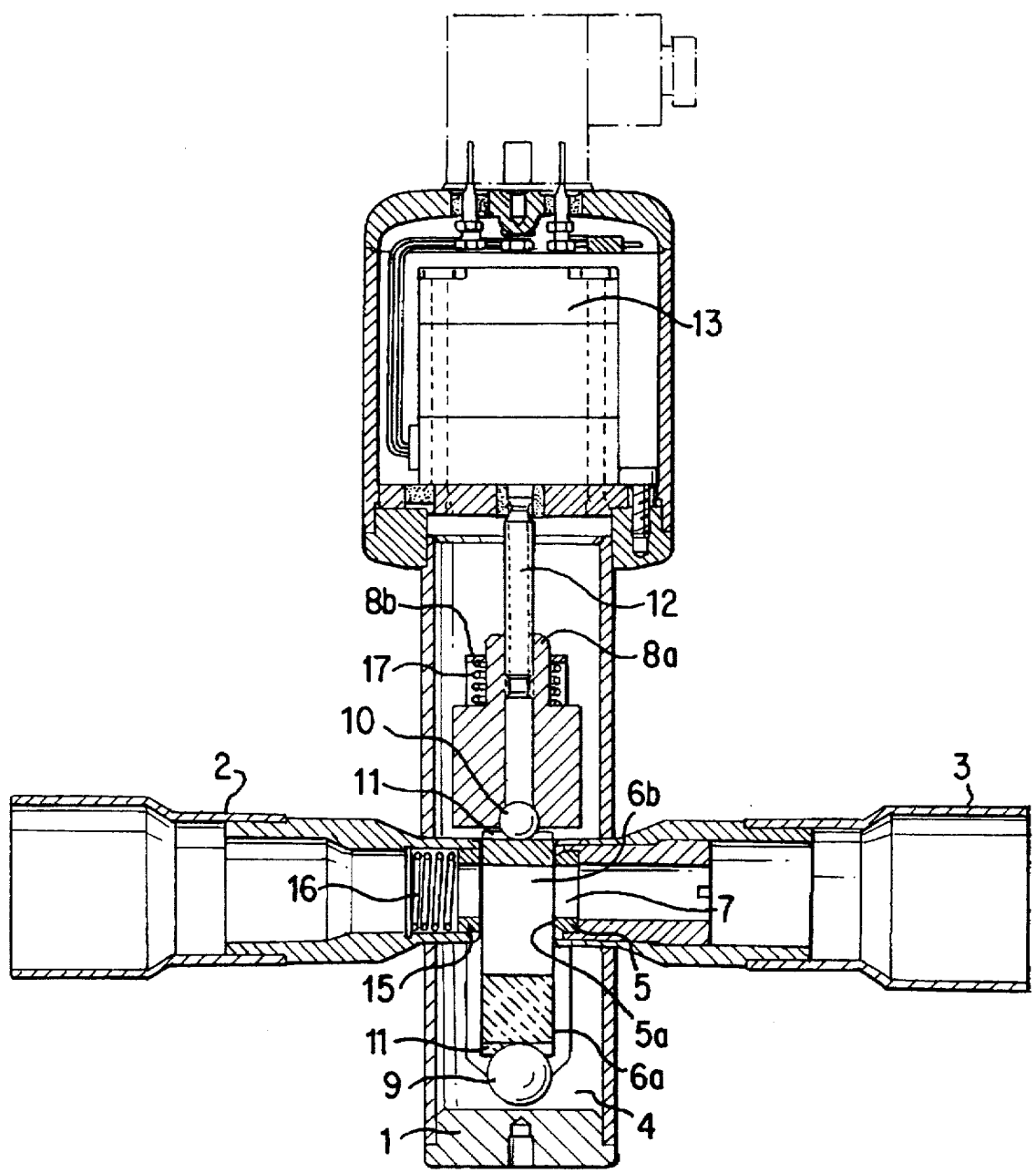
Figure 3:
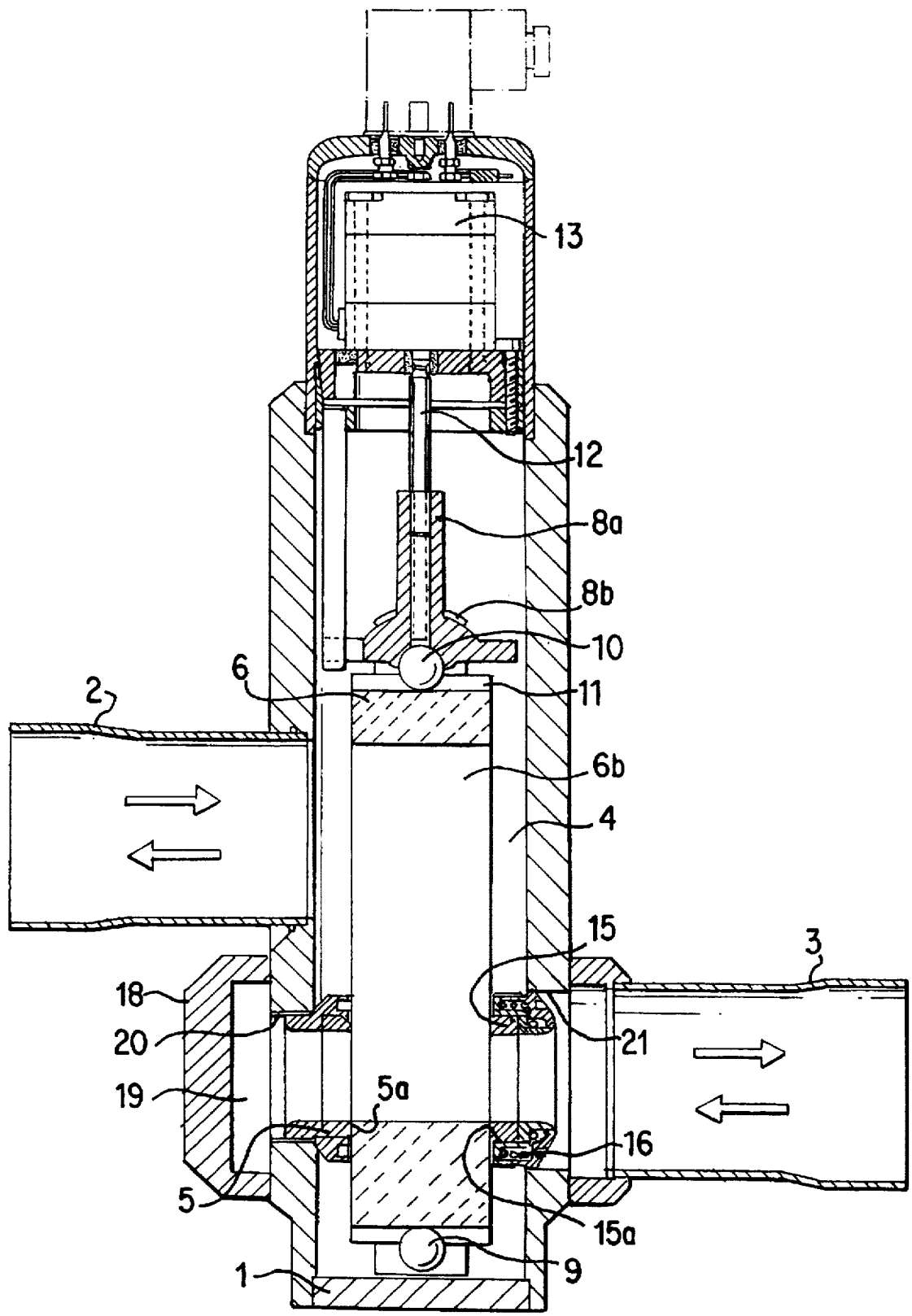
Figure 4:
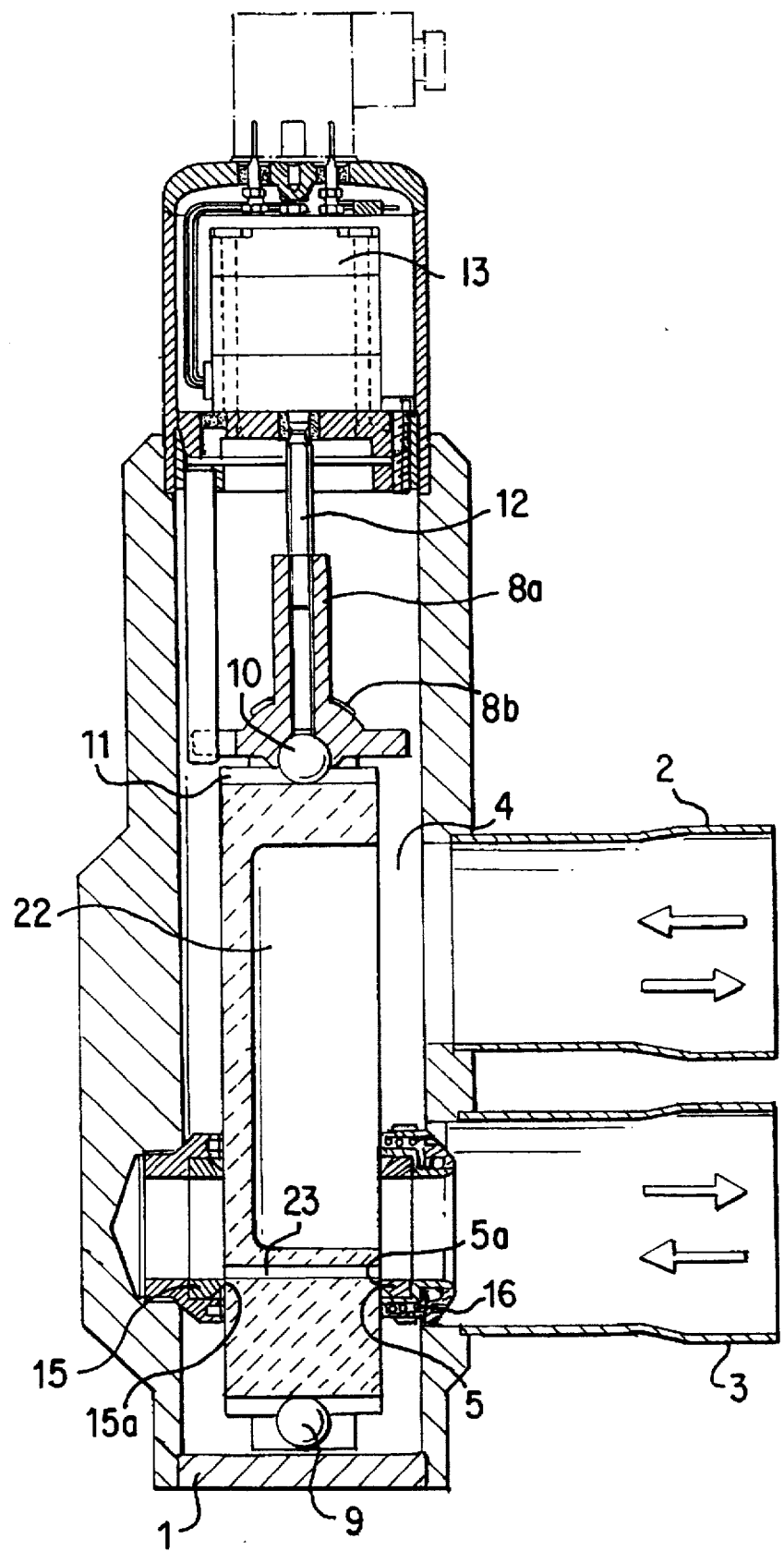

With regard to advantageous embodiments and further developments of the invention reference is made to the subordinate claims and also to the subsequent description of embodiments with reference to the accompanying drawing in which are shown:

FIG. 1 a first embodiment of a valve arrangement in accordance with the invention in longitudinal section;

FIG. 2 a second embodiment of a valve arrangement in accordance with the invention in longitudinal section;

FIG. 3 a third embodiment of a valve arrangement in accordance with the invention in longitudinal section; and FIG. 4 a fourth embodiment of a valve arrangement in accordance with the invention in longitudinal section.

FIG. 1 shows a first embodiment of a valve arrangement in accordance with the invention. The valve arrangement includes a valve housing 1 having a first pressure medium connection 2 and a second pressure medium connection 3 provided diametrically opposite to each other and connected together by a throughflow space 4 formed in a cavity of the housing.

A slider element 6 which cooperates with a valve seat 5a is provided in the valve housing 1 and the slider element is guided in the valve housing 1 parallel to the valve seat 5a between a closed position in which a contact surface 6a of the slider element 6 closes off a throughflow opening 7 formed by a valve seat 5a and an open position in which a throughflow passage 6b formed in the slider element 6 frees the throughflow opening 7.

The slider element 6 is held in a frame 8 of resilient material and is movable relative to the frame 8. Rolling elements, formed as balls 9, 10 for the mounting of the slider element 6 are provided in the frame 8 between the oppositely disposed end faces of the slider element 6 in the direction of adjustment of the slider element 6 and the frame 8. The balls 9, 10 are held oppositely disposed to one another in the frame 8 and run in guides 11 of the slider element 6 which are aligned perpendicular to the contact surface 6a.

Corresponding sliding elements can also be provided in place of the rolling elements.

Through this design of the slider element 6 at the frame 8 the slider element 6 is displaceable relative to the frame 8 in the direction of valve seat 5a and back. In addition the slider element 6 can execute tilting movements about an axis A extending through the centerpoints of the balls 9, 10 and also about a further axis B lying perpendicular to this axis A and parallel to the contact surface 6a.

Thus the slider element 6 can execute all movements relative to the frame 8 which are necessary for accurate positioning and alignment of the slider element 6 relative to the valve seat 5a.

The frame 8 is held between a positioning element 12 of a drive 13 mounted on the valve housing 1, the positioning element being movable in the adjustment direction of the slider element 6, and a compression spring element 14 which is held in the valve housing 1, is braced against the valve housing 1 and presses the frame against the positioning element 12 in the adjustment direction of the slider element 6. On actuation of the drive 13 the slider element 6 is moved by the positioning element 12 against the spring force of the compression spring element 14 in the direction of the compression spring element 14. On an actuation of the positioning element in the opposite direction, the slider element 6 is held by the compression spring element 14 in contact against the positioning element 12.

Through this arrangement it is possible in a simple and rapid manner to exchange the frame 8 together with the slider element 6, since no firm connection exists between the positioning element 12 and the frame 8.

Moreover the slider element 6 is automatically moved into its closed position by the compression spring element 14 when the motor of the drive is set out of operation, for example by a power failure.

The frame 8 can also be formed of two adjustable frame parts between which the slider element 6 is held by the spring force of the compression spring element 14.

For the guidance of the slider element 6 in the valve housing 1 the slider element 6 is arranged between the valve seat 5a and a guide element 15 provided in the valve housing 1 opposite to the valve seat 5a. The guide element 15 is adjustably guided in the direction of the valve seat 5a relative to the valve housing 1 and is biased by a spring element 16 in the direction towards the valve seat 5a, so that the guide element 15 presses the slider element 6 against the valve seat 5 through the spring force of the spring element 16. In this arrangement the slider element 6 can essentially move freely relative to the frame 8 and thus adopt an exact position opposite to the valve seat 5a.

The slider element 6 and also the valve seat and guide elements 5, 15 consist of a chemically resistant material with high sliding qualities and a high resistance to abrasion, in particular of a ceramic material.

The second embodiment of a valve arrangement shown in FIG. 2 is formed in similar manner to the valve arrangement shown in FIG. 1 and includes a valve housing 1 with a first pressure medium connection 2 and a second pressure medium connection 3 which is diametrically oppositely disposed to the first pressure medium connection 2. A slider element 6 is displaceably arranged in the valve housing 1 and is guided between a valve seat 5a formed at the housing end of the second pressure medium connection 3 and a guide element 15 which lies opposite the valve seat 5. The guide element 15 is movable in the direction of the valve seat 5a and is biased by a spring element 16.

The slider element 6 is arranged in a frame 8 which is formed by a first frame part 8a connected to the positioning element 12 of a drive 13 and by a second frame part 8b which is mounted on the first frame part 8a and movably guided relative to the latter in the direction of adjustment of the slider element 6. The slider element 6 lies between the two frame parts 8a, 8b and is held by the spring force of the spring element 17 which is braced between the first frame part 8a and the second frame part 8b.

In the frame 8 the slider element 6 is journalled by rolling elements 9, 10 which are held between the first frame part 8a and the second frame part 8b and displaceably guided perpendicular to the contact surface 6a of the slider element 6. In this way the slider element 6 can execute pivotal movements relative to the frame 8 about an axis A extending through the center points of the rolling elements 9, 10 and also about a further axis B lying perpendicular to this axis A and parallel to the contact surface 6a and can also be displaced. Thus the slider element 6 is essentially freely adjustably relative to the frame 8 and thus also relative to the valve seat 5a.

A third embodiment of a valve arrangement in accordance with the invention is shown in FIG. 3 with a slider element 6 which is movably arranged in a frame 8 and adjustable via a drive 13.

In this valve arrangement the frame 8 is of two-part form in just the same way as the embodiment shown in FIG. 2 and consists of a first frame part 8a connected to the positioning element 12 of the drive 13 and of a second frame part 8b which is mounted on the first frame part 8a and is movably guided relative to the latter in the adjustment direction of the slider element 6.

In the embodiment shown in FIG. 2, a spring element 17 is provided between the frame parts 8a, 8b, with the spring force of the spring element holding the slider element 6 between the frame parts 8a, 8b. In contrast, in the valve arrangement shown in FIG. 3, the second frame part 8b consists of a resilient material and is prestressed in tension in order to hold the slider element 6 between the frame parts 8a and 8b.

The pressure medium connections 2, 3 are arranged on the valve housing and are displaced in the direction of adjustment of the slider element 6, with the second pressure medium connection 3 opening at the housing end into a broadened portion 18 of the housing forming a ring space 19 around the valve housing 2. The ring space 19 is connected to the throughflow space 4 in the valve housing 1 by two connection openings 20, 21 which are provided in the valve housing 1 at diametrically oppositely disposed sides. The valve seats 5a, 15a which respectively cooperate with the slider element 6 are provided at the valve openings 20, 21. One of the valve seats 15a is formed on a guide element 15 which is movable in the direction of the other valve seat 5a and is biased by spring elements 16 in order to hold the slider element 6 between the valve seats 5a, 15a under pressure and thus obtain a good contact of the valve seats 5a, 15a at the slider element 6.

Through the diametrically oppositely disposed arrangement of the two connection openings 20, 21 it is ensured that no pressure differences are present between the two sides of the slider element 6 and the frictional forces which arise on flow through the connection openings 20, 21 mutually cancel.

FIG. 4 shows a further embodiment of a valve arrangement in accordance with the present invention. This valve arrangement includes a valve housing 1 in which a slider element 6 is movably arranged in a frame 8. The position of the slider can be adjusted by a drive 13. The design of the frame 8 and the mounting of the slider element 6 in the frame 8 are precisely as described for the third embodiment of the valve arrangement earlier in connection with FIG. 3.

With the valve arrangement shown in FIG. 4 the first pressure medium connection 2 and the second pressure medium connection are arranged alongside one another on the valve housing 1 as seen in the direction of adjustment of the slider element 6 and the slider element 6 has a cutout 22 defining a flow passage which is open towards the pressure medium connections 2, 3. Moreover, a restrictor opening 23 of small diameter and extending transversely to the contact surface 6a of the slider element 6 is provided in the slider element 6 through which pressure compensation can take place between the front side and the rear side of the slider element 6, even when the slider element 6 is displaced from the position shown in FIG. 4 upwardly into its closed position in which the recess 22 of the slider element 6 no longer lies in the vicinity of the second pressure medium connection 3 and only the restrictor opening 23 produces a connection between the first and second pressure medium connections 2, 3.

With the valve arrangements of the invention the slider elements together with the frames form units which can be preassembled and interchanged in a simple manner.

The free adjustability of the slider element relative to the frame thereby ensures that the slider element can always be brought into its correct position and orientation relative to the valve seat. Through the use of a guide element which is biased in the direction of the valve seat a correct positioning of the slider element is hereby automatically achieved.

We claim:

1. Valve, in particular electronic expansion valve arrangement, for one of pneumatic and hydraulic pressure media comprising a valve housing having a first pressure medium connection and a second pressure medium connection, which are connected together by a throughflow space formed in a cavity of the housing, and a slider element which is arranged in the valve housing and cooperates with a valve seat, with the slider element being operationally connected to a positioning element of a drive and being displaceably guided parallel to the valve seat between a closed position, in which a contact surface of the slider element closes a throughflow opening formed by the valve seat, and an open position, in which a throughflow passage formed in the slider element frees the throughflow opening, and wherein the slider element is displaceable in the direction towards the valve seat and back, characterized in that the slider element is tiltably arranged in a frame engaged with the positioning element, said slider element being tiltable about at least two axes in such a manner that the position and orientation of the slider element are adjusted automatically during movement of the slider element between said open and said closed position.

2. Valve in accordance with claim 1, characterized in that at least one compression spring element is provided in the valve housing, biases the frame in the direction towards the positioning element and holds the frame against the positioning element.

3. Valve in accordance with claim 1, characterized in that the frame has a first frame part connected to the positioning element of the drive and a second frame part connected to the first frame part; and in that the slider element is braced against the two frame parts and is held between them.

4. Valve in accordance with claim 1, characterized in that the frame consists at least regionally of a resilient material; and in that the slider element is held in the frame by the spring force of the resilient material.

5. Valve in accordance with claim 3, characterized in that the second frame part is movably guided relative to the first frame part in the adjustment direction of the slider element; and in that a spring element is provided between the frame parts which biases the second frame part in the direction towards the positioning element in order to hold the slider element between the frame parts through the spring force of the spring element.

6. Valve in accordance with claim 1, characterized in that the slider element is guided in the frame at opposite sides in the direction of adjustment of the slider element (6) by one of rolling elements and sliding elements.

7. Valve in accordance with claim 6, characterized in that the rolling elements are one of balls and rollers.

8. Valve in accordance with claim 1, characterized in that the slider element is guided between the valve seat and a guide element arranged in the valve housing opposite to the valve seat.

9. Valve in accordance with claim 8, characterized in that the guide element is movable in the direction of the valve seat and is biased in the direction towards the valve seat by a spring element which is arranged in a fixed position at the valve housing and presses the slider element against the valve seat.

10. Valve in accordance with claim 8, characterized in that the valve seat is formed on a valve seat element movable in the direction of the guide element; and in that the valve seat element is biased in the direction of the guide element by a spring element arranged in a fixed position at the valve housing and presses the slider element towards the guide element.

11. Valve in accordance with claim 8, characterized in that the pressure medium connections are diametrically oppositely disposed at the valve housing and the valve seat and the guide element are provided at the housing ends of the pressure medium connections; and in that a further valve seat which cooperates with the slider element is provided at the guide element.

12. Valve in accordance with claim 8, characterized in that the pressure medium connections are provided at the valve housing offset in the direction of adjustment of the slider element; in that a ring space which surrounds the throughflow space is formed between the first pressure medium connection and the throughflow space in the valve housing and is connected with the throughflow space through two diametrically oppositely disposed connection openings; in that the valve seat and the guide element are provided at the connection openings; and in that a further valve seat which cooperates with the slider element is provided at the guide element 15.

13. Valve in accordance with claim 8, characterized in that the guide element consists of a chemically resistant material with high sliding characteristics and a high resistance to abrasion.

14. Valve in accordance with claim 1, characterized in that the valve seat is formed on a valve seat element arranged at the valve housing and the valve seat element consists of a chemically resistant material with good sliding characteristics and a high resistance to abrasion.

15. Valve in accordance with claim 13, characterized in that at least one of the guide element and the valve seat element consists of a ceramic material.

16. Valve in accordance with claim 1, characterized in that the slider element consists of a chemically resistant material with high sliding characteristics and a high resistance to abrasion.

17. Valve in accordance with claim 16, characterized in that the slider element consists of ceramic material.

18. Valve in accordance with claim 1, characterized in that a restrictor opening is provided in the slider element through which the second pressure medium connection is connectable to a closed space lying opposite to the pressure medium connection independently of a sealing seat formed by the valve seat and the slider element.

19. Valve in accordance with claim 1, wherein said slider element is tiltably arranged in said frame via a means for tilting which is disposed at each longitudinal end of the slider valve between the slider valve and the frame.

20. A valve comprising:
   a valve housing having a first pressure medium connection and a second pressure medium connection;
   a valve seat defining a throughflow opening communicating said first and second pressure medium connections;
   a drive element;
   a frame operatively engaged with said drive element; and
   a slider element having first and second opposing longitudinal ends defining a longitudinal axis, said slider element being movably arranged in said frame via a plurality of positioning elements, at least one of said positioning elements being disposed between said first longitudinal end of the slider element and a first adjacent portion of the frame, and at least one of said positioning elements being disposed between said second longitudinal end of the slider element and a second adjacent portion of the frame,
   said slider element being longitudinally displaceable via said drive element, said slider element, and said positioning elements between an open position, in which said first pressure medium connection is communicated with said second pressure medium connection via a throughflow passage formed in the slider element and said throughflow opening of the valve seat, and a closed position, in which a contact surface of the slider element blocks said throughflow opening of the valve seat,
   said first and second longitudinal ends of the slider element being movable relative to said first and second adjacent portions of the frame in a direction perpendicular to said longitudinal axis via said positioning elements such that the position and orientation of the slider element with respect to the valve seat is automatically adjusted during movement of the slider element between said open and said closed position.

21. A valve according to claim 20, wherein said first and second adjacent portions of the frame are biased toward each other to hold said slider element therebetween.

22. A valve according to claim 20, wherein said positioning elements are one of rolling elements, sliding elements, and balls.

* * * * *